US009502849B2

(12) United States Patent
Cheung et al.

(10) Patent No.: US 9,502,849 B2
(45) Date of Patent: Nov. 22, 2016

(54) COMMUTATOR

(75) Inventors: Chun Kit Cheung, Hong Kong (CN); Duncan Yiu Lung Wong, Hong Kong (CN); James Ching Sik Lau, Hong Kong (CN); Wilfried Gorlt, Filderstadt (DE)

(73) Assignee: JOHNSON ELECTRIC S.A., Murten (CH)

( * ) Notice: Subject to any disclaimer, the term of this patent is extended or adjusted under 35 U.S.C. 154(b) by 599 days.

(21) Appl. No.: 13/550,996

(22) Filed: Jul. 17, 2012

(65) Prior Publication Data

US 2013/0020892 A1 Jan. 24, 2013

(30) Foreign Application Priority Data

Jul. 18, 2011 (CN) .......................... 2011 1 0200809
Dec. 26, 2011 (CN) .......................... 2011 1 0442129
Dec. 26, 2011 (CN) .......................... 2011 1 0442363

(51) Int. Cl.
*H01R 43/06* (2006.01)
*H01R 39/32* (2006.01)
*H02K 11/02* (2016.01)
*H02K 13/04* (2006.01)
*H02K 7/08* (2006.01)

(52) U.S. Cl.
CPC .............. *H01R 43/06* (2013.01); *H01R 39/32* (2013.01); *H02K 11/028* (2013.01); *H02K 13/04* (2013.01); *H02K 7/083* (2013.01); *Y10T 29/49011* (2015.01)

(58) Field of Classification Search
CPC .... H02K 13/04; H02K 11/028; H01R 39/32; H01R 43/06; Y10T 29/49011
USPC ........ 310/234, 233, 235, 236, 128, 173, 238
See application file for complete search history.

(56) References Cited

U.S. PATENT DOCUMENTS

| | | | | |
|---|---|---|---|---|
| 3,129,350 A | | 4/1964 | Clark | |
| 4,876,474 A | * | 10/1989 | Wang et al. | .................. 310/236 |
| 4,881,000 A | * | 11/1989 | Wang | ............................. 310/234 |
| 5,293,092 A | * | 3/1994 | Strobl | ............................. 310/236 |
| 5,373,209 A | * | 12/1994 | Strobl et al. | .................. 310/234 |
| 5,446,328 A | * | 8/1995 | Suzuki et al. | ................. 310/233 |
| 5,677,588 A | * | 10/1997 | Strobl | ............................. 310/237 |
| 5,895,990 A | * | 4/1999 | Lau | .................................. 310/51 |

(Continued)

FOREIGN PATENT DOCUMENTS

| | | |
|---|---|---|
| CN | 1100238 (A) | 3/1995 |
| CN | 101309027 (A) | 11/2008 |

(Continued)

*Primary Examiner* — Terrance Kenerly
*Assistant Examiner* — Rashad Johnson
(74) *Attorney, Agent, or Firm* — Muncy, Geissler, Olds & Lowe, P.C.

(57) ABSTRACT

A commutator includes a first body and a second body which are separately made of electrically insulating material, a plurality of commutator segments fixed on an outer surface of the first body and a plurality of commutator terminals. The first body is a hollow cylinder with two opposite ends. Each terminal has a contact area for contacting a corresponding one of the commutator segments. The second body has a base and a ring wall extending from the base, and one end of the first body is received in a space defined by the base and the ring wall, with the contact area of each terminal being in tight contact with the corresponding commutator segment at the inner side of the ring wall.

20 Claims, 7 Drawing Sheets

(56) References Cited

U.S. PATENT DOCUMENTS

| | | | | |
|---|---|---|---|---|
| 5,932,949 A * | 8/1999 | Ziegler | | H01R 39/045 |
| | | | | 310/235 |
| 6,160,337 A * | 12/2000 | Warner | | H01R 39/045 |
| | | | | 29/597 |
| 6,222,298 B1 * | 4/2001 | Saito et al. | | 310/233 |
| 6,242,838 B1 * | 6/2001 | Kiyose et al. | | 310/233 |
| 6,525,445 B2 * | 2/2003 | Kiyose et al. | | 310/233 |
| 6,611,077 B2 * | 8/2003 | Yokomizo | | H02K 13/105 |
| | | | | 310/221 |
| 6,617,742 B2 * | 9/2003 | Lau | | H02K 3/527 |
| | | | | 310/234 |
| 6,634,082 B1 * | 10/2003 | Ziegler et al. | | 29/597 |
| 6,657,355 B2 * | 12/2003 | Kiyose | | H01R 39/045 |
| | | | | 310/233 |
| 6,664,668 B2 * | 12/2003 | Furuya | | H01R 39/32 |
| | | | | 29/597 |
| 6,707,218 B2 * | 3/2004 | Furuya | | H01R 39/32 |
| | | | | 310/233 |
| 6,731,041 B2 * | 5/2004 | Furuya et al. | | 310/234 |
| 6,774,526 B2 * | 8/2004 | Furuya | | H01R 39/32 |
| | | | | 310/233 |
| 6,946,758 B2 * | 9/2005 | Du | | H02K 1/30 |
| | | | | 310/235 |
| 6,979,922 B2 | 12/2005 | Simofi-Ilyes et al. | | |
| 7,800,266 B2 | 9/2010 | Yeung et al. | | |
| 2005/0082937 A1 | 4/2005 | Simofi-Ilyes et al. | | |
| 2010/0225198 A1 * | 9/2010 | Lau et al. | | 310/248 |

FOREIGN PATENT DOCUMENTS

| | | |
|---|---|---|
| CN | 102064447 (A) | 5/2011 |
| JP | 57052777 U | 9/1955 |
| JP | 5244752 A | 9/1993 |

* cited by examiner

US 9,502,849 B2

COMMUTATOR

CROSS REFERENCE TO RELATED APPLICATIONS

This non-provisional patent application claims priorities under 35 U.S.C. § 119(a) from Patent Application No. 201110200809.5 filed in The People's Republic of China on Jul. 18, 2011, Patent Application No. 201110442129.4 filed in The People's Republic of China on Dec. 26, 2011, and Patent Application No. 201110442363.7 filed in The People's Republic of China on Dec. 26, 2011.

FIELD OF THE INVENTION

This invention relates to a commutator for an electric motor and in particular, to an assembled commutator having separately formed commutator segments and terminals.

BACKGROUND OF THE INVENTION

FIGS. 1 and 2 show an assembled commutator disclosed by JP5244752A. The commutator 10 has several segments 1 supported by a commutator base 5. Each segment 1 has a terminal 2 and a segment portion 3 that are separately formed. One end of the segment piece 3 is inserted into an opening 6 of the commutator base 5. A joining section 2a is formed by bending one end of the terminal 2. The terminal 2 is connected to the segment piece 3 by means of a fixing ring 4 clamping the joining section 2a against the segment piece 3. This provides a good utilization of segment material but the connection between the terminal and the segment piece is not secure and may lead to connection issues Thus there is a desire for a new assembled commutator having a secure connector between the terminals and the segment pieces.

SUMMARY OF THE INVENTION

Accordingly, in one aspect thereof, the present invention provides a commutator, comprising: a first body and a second body which are separately made of electrically insulating material, the first body being a hollow cylinder with first and second axial ends; a plurality of commutator segments disposed on an outer surface of the first body; and a plurality of commutator terminals, each commutator terminal having a contact area for contacting a corresponding one of the commutator segments; wherein the second body has a base and a ring wall extending from the base, and the first end of the first body is received in a space defined by the base and the ring wall, with the contact area of each commutator terminal being in tight contact with the corresponding commutator segment at the inner side of the ring wall.

Preferably, each commutator terminal has a U-shaped end with two opposing branches, the ring wall being tightly inserted between the two branches.

Preferably, each commutator terminal is circumferentially positioned in a slot formed in the ring wall.

Preferably, a ring varistor having electrodes is provided and each commutator terminal and a corresponding one of the electrodes being electrically connected to each other by a solder connection connecting a surface of the terminal to a surface of the electrode which face each other.

Alternatively, a ring varistor having electrodes is provided and each commutator terminal and a corresponding one of the electrodes being electrically connected to each other by a solder connection connecting a surface of the terminal to a surface of the electrode which are perpendicular to each other.

Preferably, at least two projections are formed on one end surface of the ring wall remote from the base, and the commutator further has a ring varistor with an inner surface that is pressed onto outer surfaces of the at least two projections.

Preferably, the base has a first surface contacting an end surface of the first end of the first body, one of the first surface and said end surface having a groove and the other one having a matching rib.

Preferably, a plurality of fins are formed on the outer surface of the first body, each commutator segment being positioned between two adjacent fins.

According to a second aspect thereof, the present invention also provides an electric motor, comprising a rotor and a stator, the rotor having a shaft, a rotor core fixed on the shaft, a commutator fixed on the shaft adjacent to the rotor core, and rotor windings wound on the rotor core and electrically connected to the commutator, the commutator comprising a first body, a second body, a plurality of commutator segments, and a plurality of commutator terminals, the first body and the second body being separately made of electrically insulating material, the first body being a hollow cylinder with first and second axial ends, the commutator segments being disposed on an outer surface of the first body, and each commutator terminal having a contact area for contacting a corresponding one of the commutator segments, wherein the second body has a base and a ring wall extending from the base, and the first axial end of the first body is received in a space defined by the base and the ring wall, with the contact area of each commutator terminal being in tight contact with the corresponding commutator segment at the inner side of the ring wall.

Preferably, the stator has an oil-impregnated bearing adjacent to the commutator, and the commutator further has an oil stopper integrally extending from the second axial end of the first body adjacent to the bearing.

Preferably, the oil stopper has an annular tip, the outer diameter of which is greater than the diameter of an imaginary cylinder defined by outer surfaces of the commutator segments.

Preferably, the annular tip extends into a bearing holder that holds the bearing.

Preferably, the oil stopper has at least one axially extending portion extending from a surface of the oil stopper facing the second body, the commutator segments being radially positioned between the first body and the at least one axial extending portion.

Preferably, the base has a first surface contacting an end surface of the first end of the first body, one of the first surface and said end surface having a groove and the other one having a matching rib.

Preferably, the second body further has at least one protrusion projecting into at least one receiving hole formed on the rotor core, and the oil stopper further has a marker circumferentially aligned with the protrusion.

According to a third aspect thereof, the present invention also provides a method of forming a commutator, comprising the steps of: disposing a plurality of commutator segments on an outer surface of a first body made of electrically insulating material; assembling a plurality of commutator terminals to a second body made of electrically insulating material; and assembling the first body with the commutator segments to the second body with the commutator terminals so that each commutator terminal is in tight contact with a corresponding one of the commutator segments.

Preferably, the method includes a step of electrically connecting a varistor to the commutator terminals before assembling the first body with the second body.

Preferably, the method includes a step of electrically connecting rotor windings of an electric motor to the commutator terminals before assembling the first body with the second body.

In the embodiments of the present invention, the ring wall extending from the base can generate a stable pressure on the terminals and the commutator segments such that stable contact between the commutator segments and the terminals is obtained. Moreover, the concentricity of the commutator segments and the balance of the motor rotor are assured.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
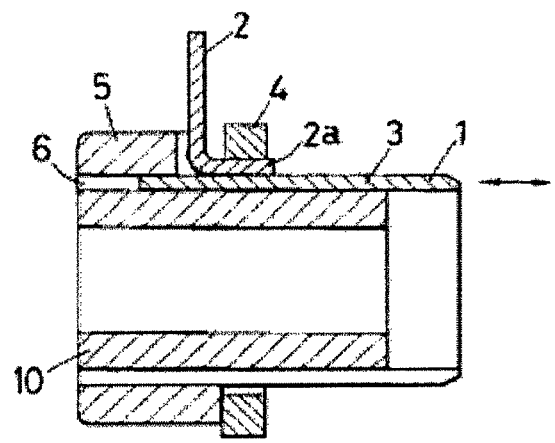
FIG. 1 is a sectional view of a prior art commutator.
Figure 2:
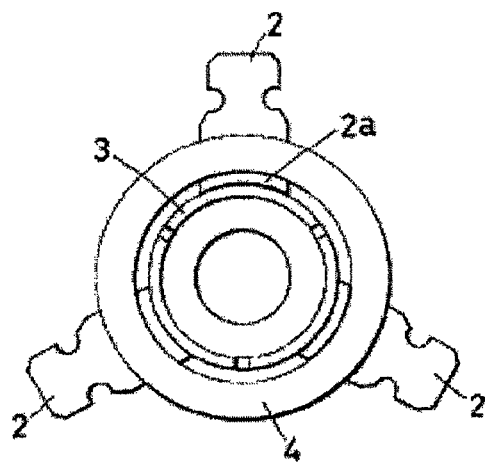
FIG. 2 is an end view of the commutator of FIG. 1.
Figure 3:
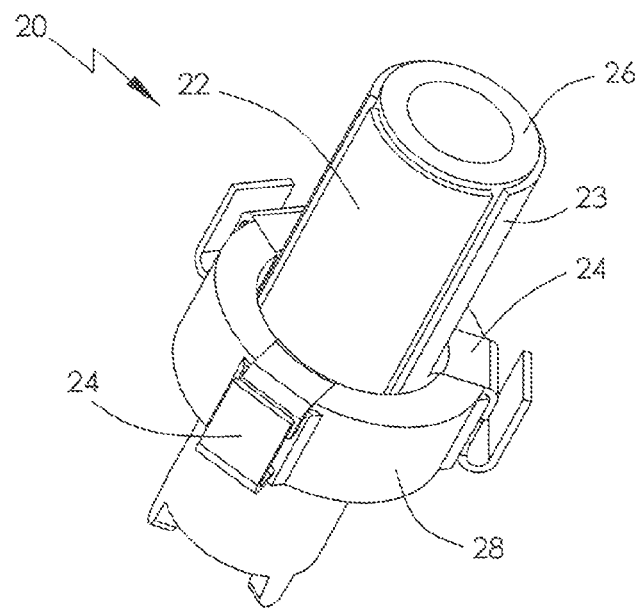
FIG. 3 illustrates an assembled a commutator in accordance with a first preferred embodiment of the present invention.
Figure 4:
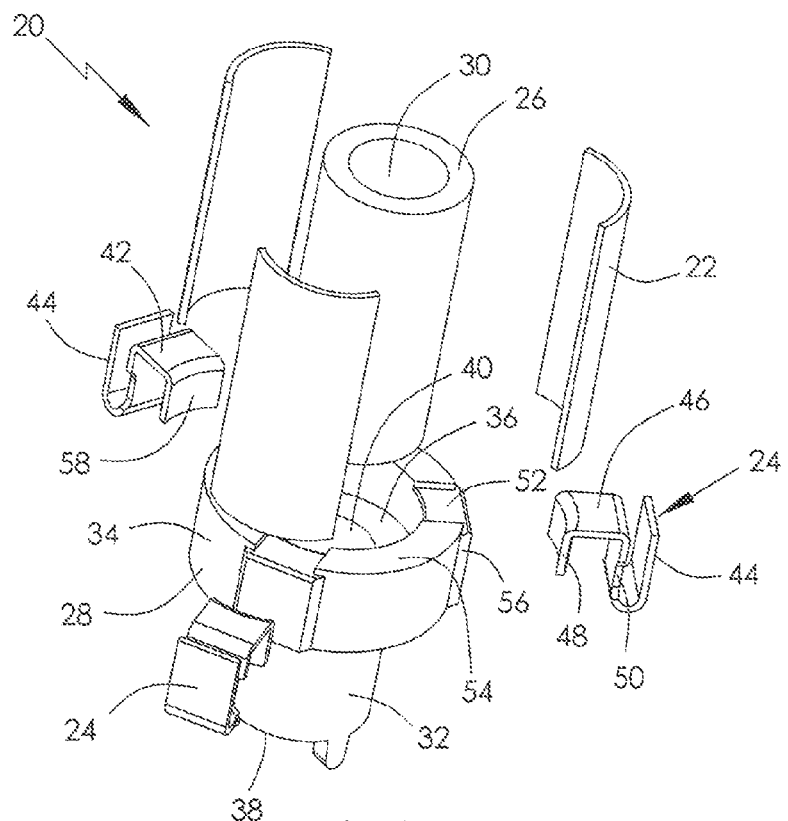
FIG. 4 is an exploded view of the commutator of FIG. 3.
Figure 5:
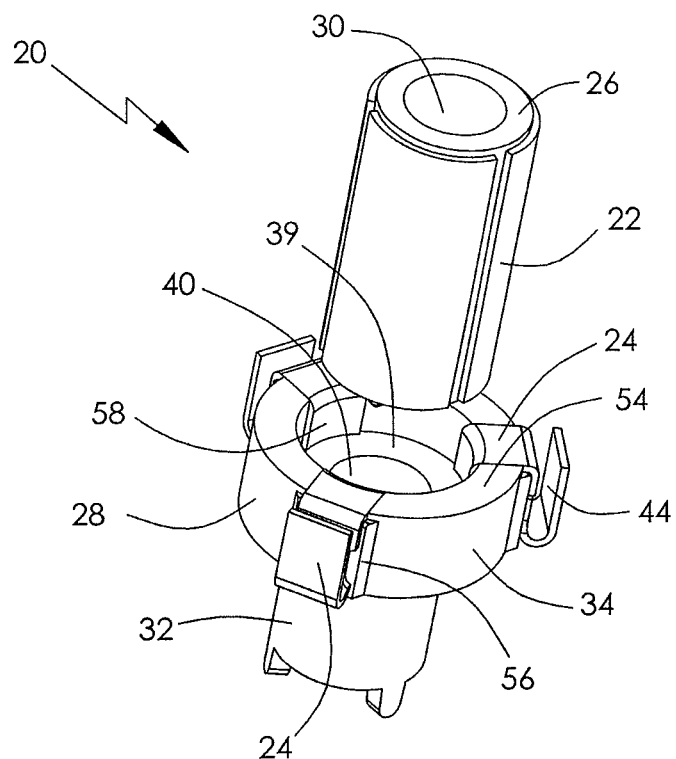
FIG. 5 is a partially exploded view of the commutator of FIG. 3.

Referring to FIGS. 3 to 5, a commutator 20 in accordance with a first preferred embodiment of the present invention has a plurality of commutator segments 22, a plurality of terminals 24, and a first body 26 and a second body 28. The commutator segments 22 and the terminals 24 are separately formed and made of electrically conductive material. The first and second bodies 26, 28 are also separately formed and made of electrically insulating material. The commutator 20 may be used in a brush motor.

The first body 26 is an elongated hollow cylinder defining an axis of the commutator, with a first circular through hole 30 extending along the axis for receiving a shaft of the rotor. The commutator segments 22 are fixed on the outer surface of the first body 26 at regular intervals in the circumferential direction. Each commutator segment 22 has an axially extending commutator surface 23 for making slide contact with brushes of the brush motor. The second body 28 has a base 32 and a ring wall 34. The base 32 is an elongated hollow cylinder having two opposite end surfaces 36, 38 and a second circular through hole 40 extending along the axis for receiving the shaft. The ring wall 34 integrally extends from the outer periphery of the first end surface 36 of the base 32 in a direction away from the second end surface 38. The base 32 and the ring wall 34 define a space 39 for receiving the first body 26. The inner surface of the ring wall 34 is coaxial with the second through hole 40. The inner diameter of the ring wall 34 is equal to or slightly greater than the diameter of an imaginary cylinder defined by the outer surfaces of the commutator segments 22 fixed on the first body 26. The diameter of the first and second circular through holes 30, 40 are the same and the first and second through holes 30, 40 are coaxial after a first end of the first body 26 has been inserted into the space 39.

Each terminal 24 has a U-shaped end 42 and a hook end 44. The U-shaped end 42 has a base portion 46 and two opposite branches 48, 50 extending from the base portion 46. Preferably, a plurality of radially extending slots 52 are formed on the end surface 54 of the ring wall 34 away from the base 32. A plurality of bumps 56 are projected from the outer surface of the ring wall 34 at the positions corresponding to the radially extending slots 52. The terminals 24 are assembled on the ring wall 34 at regular intervals in the circumferential direction. After assembling, the ring wall 34 is tightly inserted between the branches 48, 50 of each U-shaped end 42, the base portion 46 of each U-shaped end 42 is circumferentially positioned in the corresponding radially extending slot 52, the radially inner surface of the first branch 48 at the inner side of the ring wall 34 forms a contact area 58 for contacting the corresponding commutator segment 22, and the second branch 50 at the outer side of the ring wall 34 is supported by the bump 56.

After the commutator segments 22 have been fixed to the outer surface of the first body 26 and the terminals 24 have been assembled to the second body 28, the first body 26 and the second body 28 are assembled together by inserting the first end of the first body into the space 39 defined by the base 32 and the ring wall 34, with the first branch 48 of each terminal 24 being clamped between the inner surface of the ring wall 34 and the outer surface of the corresponding commutator segment 22 so that the contact area 58 of the terminal 24 is in tight contact with the commutator segment 22.

Figure 6:
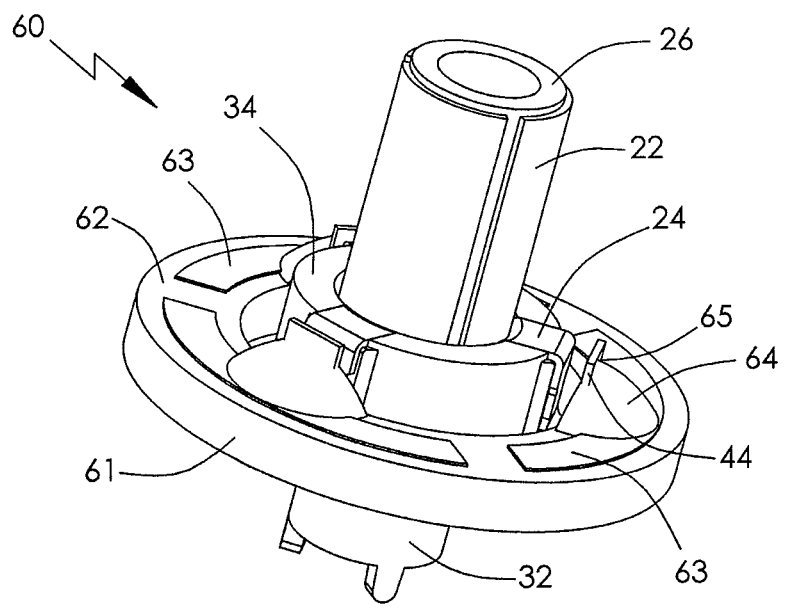
FIG. 6 illustrates the commutator of FIG. 3, fitted with a varistor in accordance with a second preferred embodiment of the present invention.

FIG. 6 is an assembled view of a commutator 60 in accordance with a second preferred embodiment of the present invention. Commutator 60 is essentially the same as commutator 20 but with a varistor added. A ring varistor 61 is coaxially arranged at the outside of the ring wall 34. The ring varistor 61 includes a ring shaped element body 62 and planar electrodes 63 formed on the upper surface of element body 62. Each terminal 24 is electrically connected to the ring varistor 61 by solder 64 between the outer surface 65 of the hook end 44 of the terminal 24 and the corresponding planar electrode 63.

Figure 7:
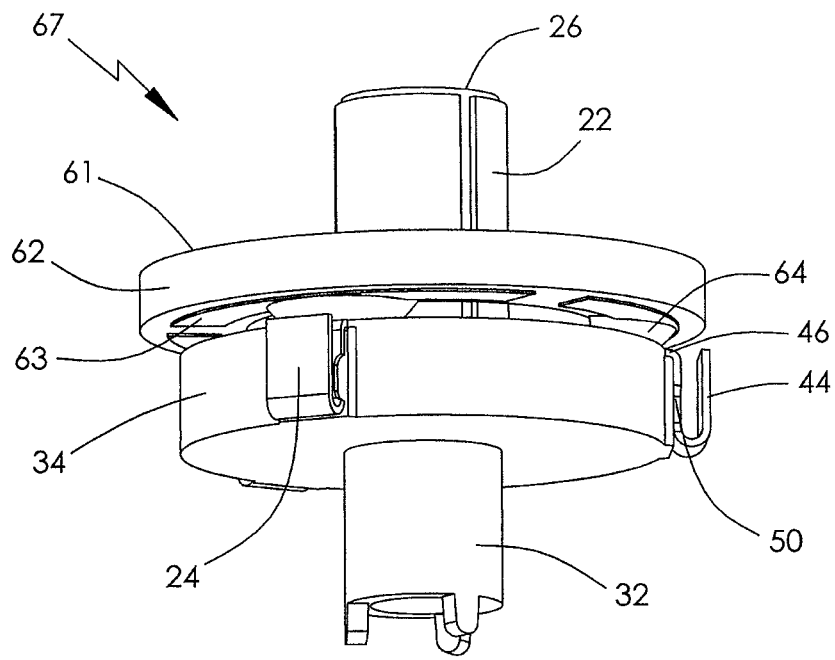
FIG. 7 illustrates an assembled commutator in accordance with a third preferred embodiment of the present invention.

FIG. 7 is an assembled view of a commutator 67 in accordance with a third preferred embodiment of the present invention. Commutator 67 is essentially the same as commutator 60 except for the location of the varistor. In this embodiment, the ring varistor 61 is coaxially arranged above the ring wall 34. Planar electrodes 63 of the ring varistor 61 are formed on the surface of the ring shaped element body 62 facing the ring wall 34. Each terminal 24 is electrically connected to the ring varistor 61 by solder 64 between the base portion 46 of the U-shaped end of the terminal 24 and the corresponding planar electrode 63.

In the commutator 60, two surfaces that are basically perpendicular to each other are soldered together. In the commutator 67, the terminal 24 is electrically connected to the ring varistor 62 by soldering between two opposite surfaces, which allows a smaller amount of solder 64 to be used and accordingly a reduced cost. Moreover, the smaller amount of solder is helpful to decrease the unevenness between the amount of solder used at different terminals, which can lead to the rotor having better balance.

Figure 8:
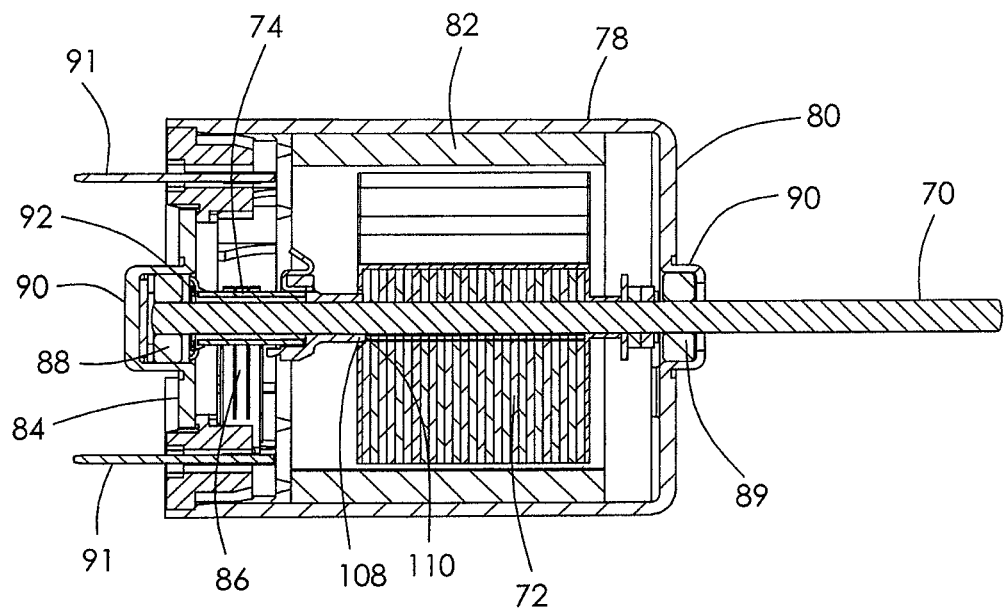
FIG. 8 is a sectional view of an electric motor incorporating a commutator in accordance with a fourth preferred embodiment of the present invention.

FIG. 8 shows a brush DC motor incorporating a commutator in accordance with a fourth preferred embodiment of the present invention. The brush DC motor 68 has a stator and a rotor. The rotor has a shaft 70, a rotor core 72 fixed on the shaft 70, a commutator 74 fixed on the shaft 70 adjacent the rotor core 72, and rotor windings (not shown) wound about poles of the rotor core 72 and electrically connected to the commutator 74. The stator has an axially extending round housing 78 having an open end and a closed end 80, permanent magnets 82 fixed to the inner surface of the housing 78, an end cap 84 closing the open end of the housing 78, and brushes 86 for making sliding contact with the commutator 74. The housing 78 is made of magnetically conductive material. The end cap 84 is fixedly mounted to the housing 78. The shaft 70 is supported by two oil-impregnated bearings 88, 89 respectively located in bearing holders 90 of the end cap 84 and the closed end 80 of the housing 78 with the rotor core 72 confronting the permanent magnets 82 across an air gap. Two motor terminals 91 electrically connected to the brushes 86, are mounted to the end cap 84. Power is supplied to the rotor windings via the motor terminals 91, the brushes 86 and the commutator 74.

Figure 9:
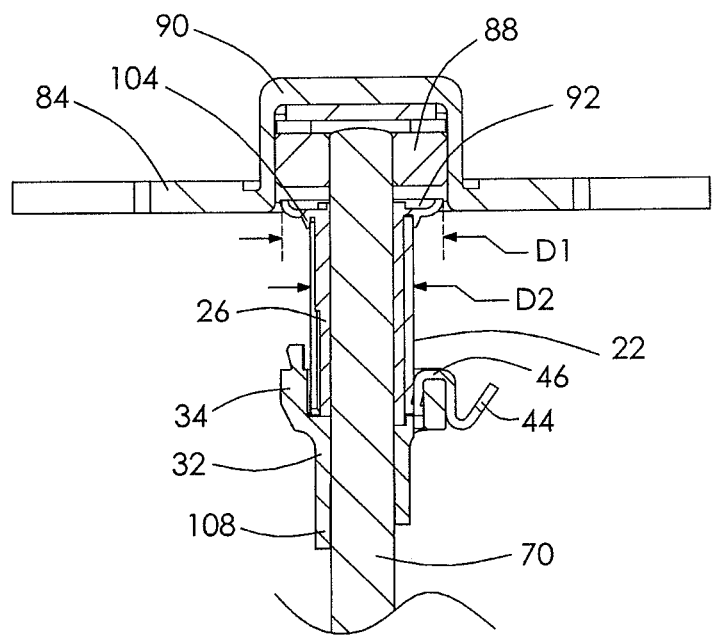
FIG. 9 is an enlarged sectional view of a portion of the electric motor of FIG. 8.
Figure 10:
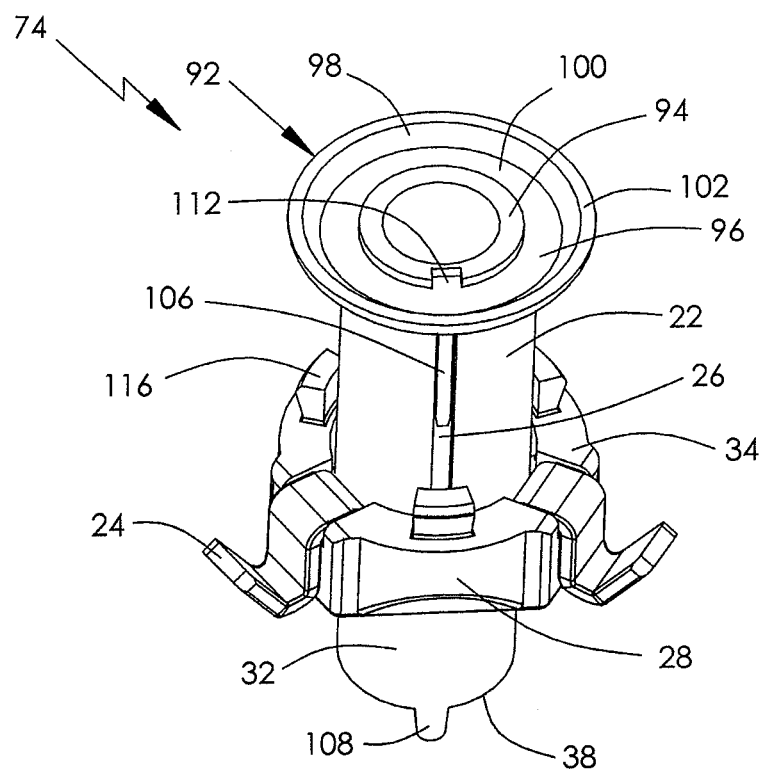
FIG. 10 illustrates the commutator of the motor of FIG. 8.

Compared with the commutator 20, the commutator 74 is essentially the same except for an oil stopper 92 integrally extending from the first body 26. FIG. 9 is an enlarged sectional view of a portion of the motor of FIG. 8, showing the arrangement of the commutator 74, the shaft 70 and the bearing 88. FIG. 10 illustrates the assembled commutator 74. As shown, the oil stopper 92 has a body portion 94 and an oil collecting portion. The body portion 94 integrally and axially extends towards the bearing 88 from the inner periphery of the second end surface of the first body 26 remote from the second body 28. The oil collecting portion includes a disc portion 96 and an outer ring 98. The disc portion 96 extends radially and outwardly from the second end of the first body 26. The outer ring 98 extends outwardly from the outer periphery of the disc portion 96 towards the bearing 88. The body portion 94, the disc portion 96, and the outer ring 98 define a space 100 for receiving oil leaking from the bearing 88. The body portion 94 is pressed onto the shaft 70 in an oil tight manner to prevent the oil in the space 100 from passing between the shaft 70 and the oil stopper 92. The inner surface of the outer ring 98 forms an annular surface outwardly inclined relative to the surface of the disc portion 96. The outer diameter D1 of the oil collecting portion is greater than the diameter D2 of the imaginary cylinder defined by the outer surfaces of the commutator segments 22. The tip 102 of the oil collecting portion extends into the bearing holder 90 for holding the bearing 88. By above configurations, oil in the space 100 is directed back to the bearing 88, and migration of oil to the commutator 74 is avoided.

Preferably, an annular flange 104, concentric with the outer surface of the first body 28, integrally and axially extends from one end surface of the disc portion 96 facing the second body 28. The axially outer ends of the commutator segments 22 are positioned between the inner surface of the annular flange 104 and the outer surface of the first body 28, to hold the axially outer ends of the segments. Thus, the concentricity of the commutator segments 22 with respect to the shaft 70 can be assured.

Preferably, a plurality of circumferentially spaced apart fins 106 axially extend on the outer surface of the first body 26. Each commutator segment 22 is positioned between two adjacent fins 106 in the circumferential direction to set the circumferential spacing of the segments.

Preferably, a number of circumferentially spaced apart protrusions 108 project from the second end surface 38 of the second body 28 and a plurality of receiving holes 110 for receiving the protrusions 108 are formed in the rotor core 72. By this configuration, the commutator 74 and the rotor core 72 can be interlocked in the circumferential direction, ensuring correct circumferential orientation between the commutator and the rotor core. Further, a notch 112 circumferentially aligned with one of the protrusions 108 is formed on the body portion 94 of the oil stopper 92. The notch 112 functions as a marker for marking the position of the protrusions, thus the protrusions 108 can be easily inserted into the receiving holes 110 during assembly. It should be understandable that the mark may alternatively be of other type, such as a small projection, such as projection 113 in FIG. 11.

Figure 11:
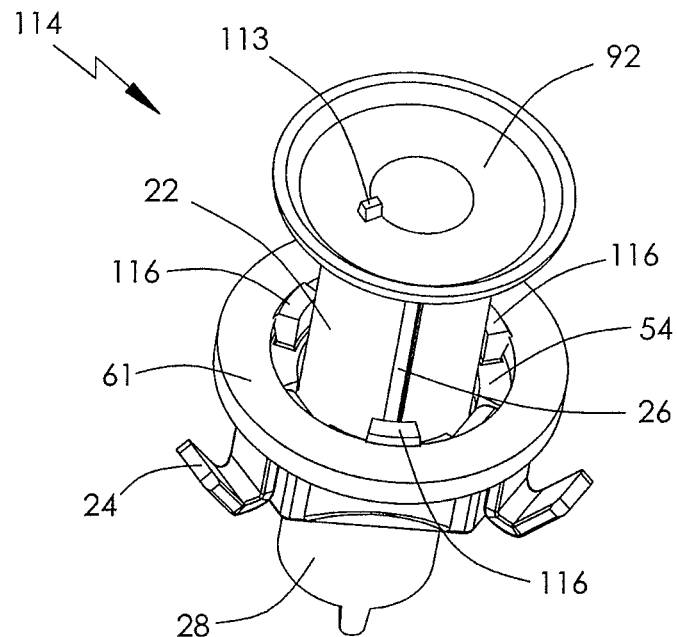
FIG. 11 illustrates the commutator of FIG. 10, fitted with a varistor, in accordance with a fifth embodiment of the present invention.
Figure 12:
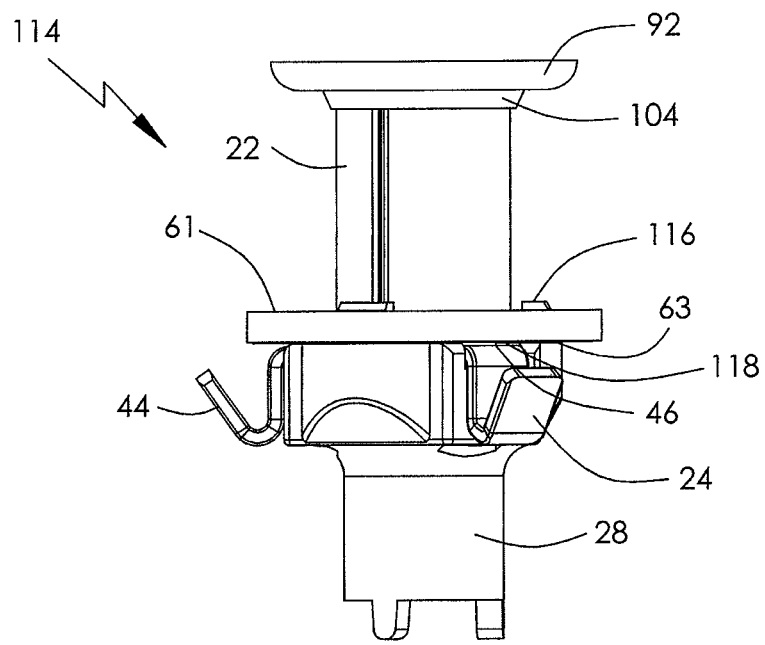
FIG. 12 is a front view of the commutator of FIG. 11.

FIG. 11 is an assembled view of a commutator 114 in accordance with a fifth preferred embodiment of the present invention. FIG. 12 is a front view of the commutator 114. Commutator 114 is essentially the same as commutator 74 with the addition of projections for mounting a varistor. In this embodiment, circumferentially spaced apart projections 116 are formed on the end surface 54 of the ring wall 34. The ring varistor 61 is supported by the end surface 54, with the inner surface of the ring varistor 61 being pressed onto the outer surfaces of the projections 116. By this configuration, the ring varistor 61 can be positioned on the second body 28 before soldering, and the concentricity of the ring varistor 61 with respect to the rotor shaft can be assured, thereby improving the balance of the rotor. A gap 118 is formed between the planar electrodes 63 of the ring varistor 61 and the base portion 46 of the terminals 24. By applying solder to the gap 118 the ring varistor 61 and the terminals 24 are electrically connected together.

Figure 13:
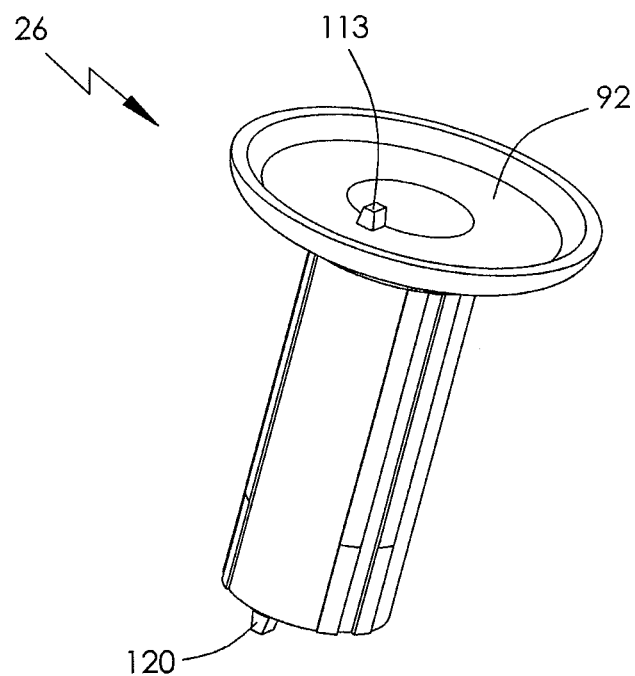
FIG. 13 is a view of a first body being a part of the commutator of FIG. 11.
Figure 14:
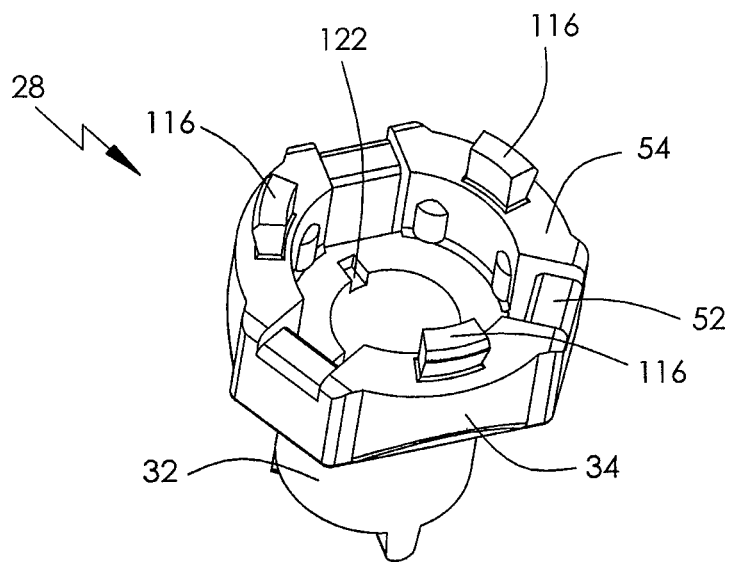
FIG. 14 is a view of a second body being a part of the commutator of FIG. 11.

Further referring to FIGS. 13 and 14, a rib 120 and a matching groove 122 are respectively formed on the opposing surfaces of the first and second bodies 26, 28. By this configuration and in conjunction with the protrusions 108, the commutator segments 22 contact the corresponding terminals 24 at a predetermined circumferential position, to achieve the desired commutation angle of the motor.

In the above mentioned embodiments of the present invention, the ring wall extending from the base can generate a stable pressure on the terminals and the commutator segments such that stable contact between the commutator segments and the terminals is obtained. Moreover, the concentricity of the commutator segments and the balance of the rotor are improved.

The present invention further provides a method of forming a commutator. The method comprises follow steps:

fixing a plurality of commutator segments on an outer surface of a first body made of electrically insulating material, assembling a plurality of commutator terminals to a second body made of electrically insulating material, and assembling the first body with the commutator segments with the second body with the commutator terminals so that each commutator terminal is in tight contact with a corresponding one of the commutator segments.

Preferably, the method further comprises steps of soldering a varistor to the commutator terminals and fixing rotor windings of an electric motor to the commutator terminals before assembling the first body with the second body. As protection against contamination of the commutator segments is not required when the varistor and rotor windings are connected to the commutator terminals before the first body is fitted to the second body, the process is simplified and the cost is reduced.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the annular flange 104 for positioning the commutator segments may be replaced by a plurality of axially extending portions spaced in the circumferential direction.

The invention claimed is:

1. A commutator, comprising:
a first body and a second body which are separately made of electrically insulating material, the first body being a hollow cylinder with first and second axial ends;
a plurality of commutator segments disposed on an outer surface of the first body, each commutator segment having a commutator surface for making slide contact with brushes of a brush motor, the commutator surface being exposed to air and axially extending a majority of the distance between the first and second axial ends of the first body; and
a plurality of commutator terminals, each commutator terminal having a contact area for contacting a corresponding one of the commutator segments;
wherein the second body has a base and a ring wall extending from the base, and the first end of the first body is received in a space defined by the base and the ring wall, with the contact area of each commutator terminal being in tight contact with the corresponding commutator segment at the radially inner side of the ring wall, the ring wall being parallel to the commutator surface.

2. The commutator of claim 1, wherein each commutator terminal has a U- shaped end with two opposing branches, the ring wall being tightly inserted between the two branches with inner and outer surfaces of the ring wall being in contact with opposing surfaces of the two branches, respectively.

3. The commutator of claim 1, wherein each commutator terminal is circumferentially positioned in a slot formed in the ring wall.

4. The commutator of claim 1, further comprising a ring varistor having electrodes, each commutator terminal and a corresponding one of the electrodes being electrically connected to each other by a solder connection connecting a surface of the terminal to a surface of the electrode which face each other.

5. The commutator of claim 1, further comprising a ring varistor having electrodes, each commutator terminal and a corresponding one of the electrodes being electrically connected to each other by a solder connection connecting a surface of the terminal to a surface of the electrode which are perpendicular to each other.

6. The commutator of claim 1, wherein at least two projections are formed on one end surface of the ring wall remote from the base, and the commutator further has a ring varistor with an inner surface that is pressed onto outer surfaces of the at least two projections.

7. The commutator of claim 1, wherein the base has a first surface contacting an end surface of the first end of the first body, one of the first surface and said end surface having a groove and the other one having a matching rib.

8. The commutator of claim 1, wherein a plurality of fins are formed on the outer surface of the first body, each commutator segment being positioned between two adjacent fins.

9. An electric motor, comprising a rotor and a stator, the rotor having a shaft, a rotor core fixed on the shaft, a commutator fixed on the shaft adjacent to the rotor core, and rotor windings wound on the rotor core and electrically connected to the commutator, the commutator comprising a first body, a second body, a plurality of commutator segments, and a plurality of commutator terminals, the first body and the second body being separately made of electrically insulating material, the first body being a hollow cylinder with first and second axial ends, the commutator segments being disposed on an outer surface of the first body, each commutator segment having a commutator surface for making slide contact with brushes of a brush motor, the commutator surface axially extending a majority of the distance between the first and second axial ends of the first body, and each commutator terminal having a contact area for contacting a corresponding one of the commutator segments,
wherein the second body has a base and a ring wall extending from the base, and the first axial end of the first body is received in a space defined by the base and the ring wall, with the contact area of each commutator terminal being in tight contact with the corresponding commutator segment at the radially inner side of the ring wall.

10. The motor of claim 9, wherein the stator has an oil-impregnated bearing adjacent to the commutator, and the commutator further has an oil stopper integrally extending from the second axial end of the first body adjacent to the bearing.

11. The motor of claim 10, wherein the oil stopper has an annular tip, the outer diameter of which is greater than the diameter of an imaginary cylinder defined by outer surfaces of the commutator segments.

12. The motor of claim 11, wherein the annular tip extends into a bearing holder that holds the bearing.

13. The motor of claim 10, wherein the oil stopper has at least one axially extending portion extending from a surface of the oil stopper facing the second body, the commutator segments being radially positioned between the first body and the at least one axial extending portion.

14. The motor of claim 10, wherein the base has a first surface contacting an end surface of the first end of the first body, one of the first surface and said end surface having a groove and the other one having a matching rib.

15. The motor of claim 14, wherein the second body further has at least one protrusion projecting into at least one receiving hole formed on the rotor core, and the oil stopper further has a marker circumferentially aligned with the protrusion.

16. A method of forming a commutator, comprising:
- disposing a plurality of commutator segments on an outer surface of a first body made of electrically insulating material;
- assembling a plurality of commutator terminals which are separately formed with the plurality of commutator segments to a second body made of electrically insulating material and separately formed with the first body; and
- assembling the first body with the commutator segments to the second body with the commutator terminals after the parts are formed in advance so that each commutator terminal is in tight contact with a corresponding one of the commutator segments.

17. The method of claim 16, further comprising a step of electrically connecting a varistor to the commutator terminals before assembling the first body with the second body.

18. The method of claim 16, further comprising a step of electrically connecting rotor windings of an electric motor to the commutator terminals before assembling the first body with the second body.

19. The commutator of claim 1, wherein each commutator terminal is in contact with the corresponding commutator segment only at the radially inner side of the ring wall.

20. The commutator of claim 1, further comprising an oil stopper integrally extending from the first body.

* * * * *